July 11, 1933.    H. RÜHLEMANN    1,917,814
CIRCUIT CONNECTIONS FOR FEEDING ENERGY TO ELECTRIC IGNITORS
Filed April 20, 1932    2 Sheets-Sheet 1
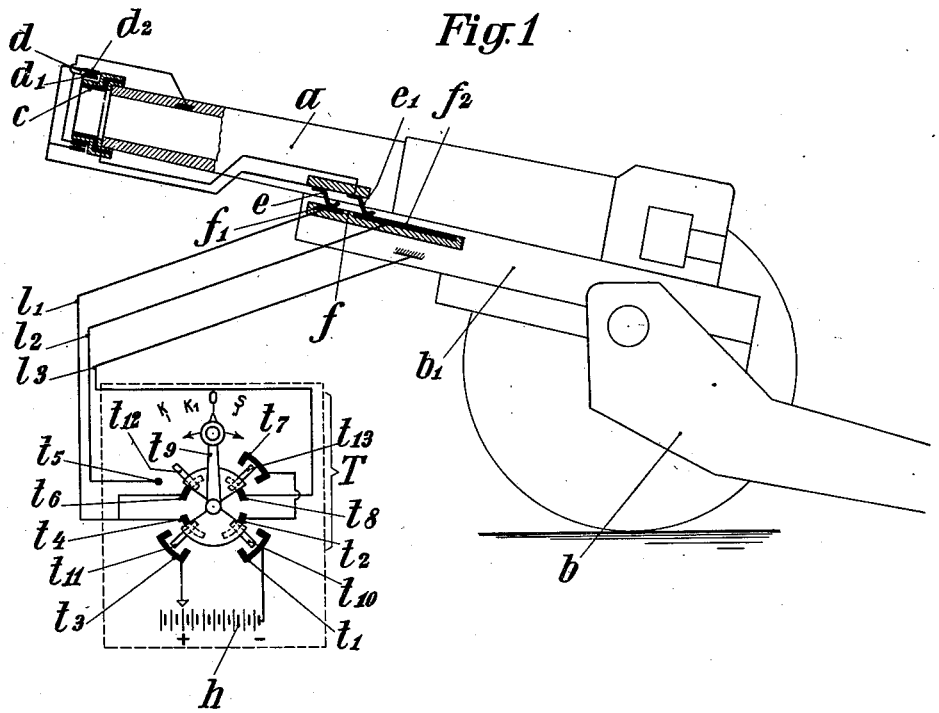
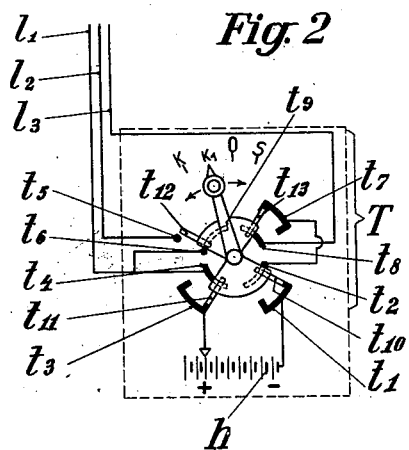
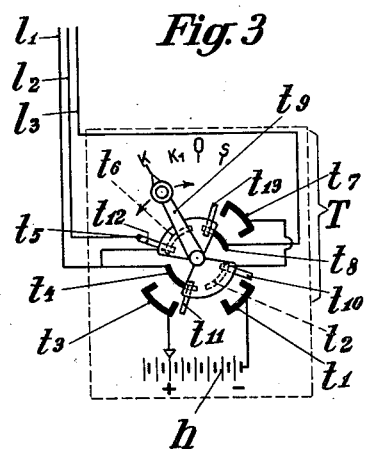
Inventor:
Herbert Rühlemann
By
Attorney July 11, 1933.    H. RÜHLEMANN    1,917,814
CIRCUIT CONNECTIONS FOR FEEDING ENERGY TO ELECTRIC IGNITORS
Filed April 20, 1932    2 Sheets-Sheet 2

Inventor:
Herbert Rühlemann
By [signature]
Attorney

Patented July 11, 1933

1,917,814

UNITED STATES PATENT OFFICE

HERBERT RÜHLEMANN, OF SOMMERDA, GERMANY, ASSIGNOR TO RHEINISCHE METALLWAAREN- UND MASCHINENFABRIK, OF DUSSELDORF-DERENDORFF, GERMANY, A CORPORATION OF GERMANY

CIRCUIT CONNECTIONS FOR FEEDING ENERGY TO ELECTRIC IGNITORS

Application filed April 20, 1932, Serial No. 606,489, and in Germany April 27, 1931.

Ignitors for shells and bombs wherein the ignition of the igniting agent, or the initiation of such ignition, is produced electrically are preferably so arranged that the necessary electrical energy is not embodied therein initially in any form whatever, for example, batteries, but are provided with the same only directly before use, from a special source of current to which they are transiently connected. The introduction of the energy into the ignitors can thereby be accomplished by means of a device which structurally is a special charging means independent of the actual device for propelling the shell, and which in addition to a source of current contains current connecting means in the form of contact rings, contact springs or the like, which are brought into contact with cooperating contact elements on the ignitor, in order to charge said ignitor. The current supplying contact elements may however also be provided directly upon the propelling device, and arranged thereon in such way that they become active only transiently upon the ignitor of a shell, only after the firing or throwing of the latter, in that, for example, they are arranged in guns in front of the muzzles thereof and that they give the necessary charge to the ignitors of shells which have been fired off and which brush past them, by contact or by induction.

In the known charging devices of this type the current transferring means are connected to the source of current by hand directly before the intended charging of a fuse or ignitor, and are then electrically "live", regardless of whether they are thereupon connected to an ignitor or not.

In accordance with the invention the circuit is so arranged that the introduction of a voltage into the feeding means, which are normally unenergized, takes place as a result of a procedure involving movement, produced by applying an ignitor thereto. Such a movement may be the introduction of an ignitor into the charging device, produced either manually, or by propelling gases in the barrel of the gun, or by falling out of a throwing device, whereby the projectile in its course will strike against a normally open switch in the connecting circuit between the source of current and the current supplying means, closing said switch and securing it in such condition until the succeeding sliding of its ignitor contacts off of the current supplying means. If these current supplying means are arranged upon the projectile guiding means themselves, that is, upon the barrel of a gun, or in a throwing device, such a circuit closing switch may also be arranged to be positively connected with the safety device for the means for firing or throwing the shell. Then the charging current circuit is closed by the disengagement of the safety device of the firing or throwing means. Another method is to connect the circuit closing switch with the firing or throwing means themselves which produce the movement of the projectile, and allow it to be controlled thereby in the manner above described. In the case of barrel-recoil guns, with current supply means arranged at the muzzle of the barrel, it is particularly advantageous to provide a circuit closing switch in the charging current circuit, which, opened when the barrel is in its forward position, is closed only by the backward movement of the barrel occurring upon firing, and before the ignitor of the shell has come into contact with the current supplying means.

The circuit connections in accordance with the invention permit an unhampered manipulation of the operating gun crew at the charging device, protecting said crew against injury by electrical discharges upon contact with the externally accessible current supply means and thereby simultaneously also prevent losses of current from the source of current. On the other hand, however, the current supplying means have become "live", upon applying an ignitor or fuse thereto, with certainty and failures of charge, such as may occur in the known circuits upon inadvertent failure to close the charging current circuit, are eliminated.

The drawings show an exemplary embodiment of the circuit in accordance with the invention, on a recoil gun, in combination with a special source of current and in an embodiment which makes possible an examination of the apparatus as to perfection of operative condition, before use.

Fig. 1 is the diagram of connections of the charging means with a charging current circuit which may be opened by the automatic switch as well as by a manually operable main switch, and shows also the gun.

Fig. 2 shows the main switch in an intermediate position assumed while being turned into the control position.

Fig. 3 shows it in the control position itself.

Figure 4:
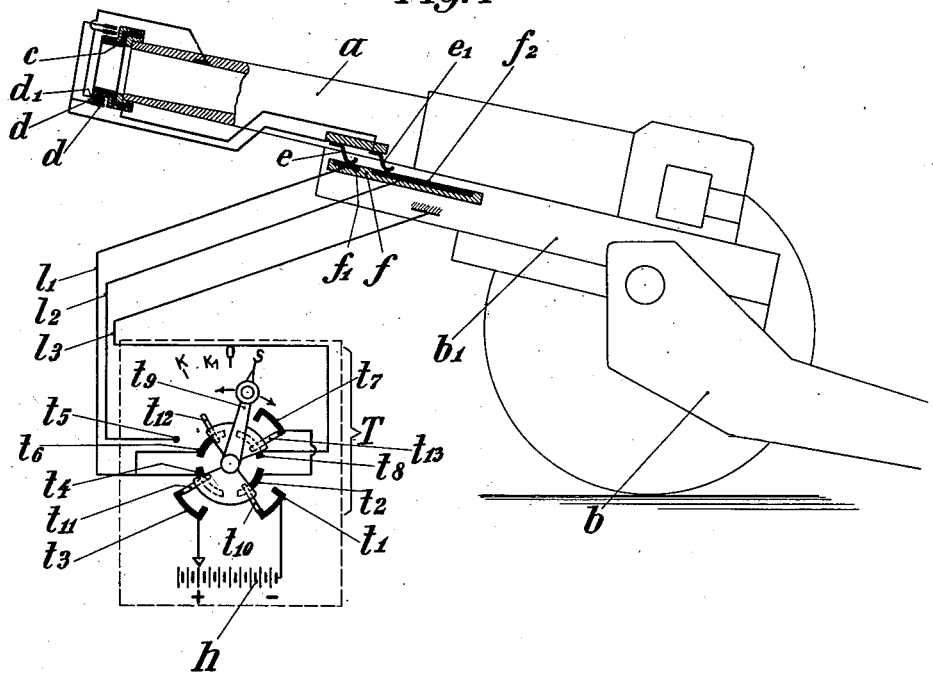
Fig. 4 shows the normal position of the charging device and the gun before the firing and Fig. 5 after the firing, at the instant of charging an ignitor of a shell.

Upon the muzzle of the barrel $a$ of a recoil gun $b$ there is arranged an insulated ring $c$, whose internal diameter is somewhat greater than the caliber of the barrel. Upon the ring $c$, for example, wound around the same, there is a condenser $d$, the "charging condenser", having the two armatures $d_1$ and $d_2$ of which $d_1$ is connected to the metal of the barrel $a$ and $d_2$ is connected to a sliding contact $e$ secured to, but insulated from, the barrel $a$. A second sliding contact $e_1$ on the barrel is connected with the rings $c$. The two contacts $e$ and $e_1$, when the barrel moves after the firing, slide upon an insulated bar $f$ secured to the cradle $b_1$ of the barrel. When the barrel $a$ is in its forward position the sliding contact $e$ lies upon a short contact element $f_1$ of the bar $f$, adjacent which and a definite distance to the rear, there is a second, longer contact element $f_2$, with which the sliding contact $e_1$ is in engagement. Conductors $l_1$ and $l_2$ lead from the two contact elements $f_1$ and $f_2$ and a third conductor $l_3$, grounded on the body of the gun, to a main switch T, which will be described more fully hereinafter, which, together with a source of current $h$, for example, a battery is arranged in a suitable manner upon the gun or is set up at a point distant therefrom.

The ring $c$ at the muzzle of the gun, in combination with the inner wall of the barrel of the gun constitutes the current supply means for introducing electrical energy into the ignitors of the shells. The charging condenser $d$ is the actual source of current which supplies a voltage to the current supply means, and which in turn receives the necessary voltage from the source of current $h$. The sliding contacts $e$ and $e_1$ upon the barrel, in combination with the cooperating contact elements $f_1$ and $f_2$ upon the cradle, form a shifting switch. The latter is positively shifted from one position, in which it connects the source of current $h$ to the charging condenser $d$ and disconnects the latter from the ring $c$, into a second position wherein it disconnects the source of current $h$ from the charging condenser $d$ and connects the latter to the ring $c$, in dependence upon a recoil of the barrel produced by firing, and thus in dependence upon a movement produced by applying an ignitor against the current supply means (ring $c$).

The manually operated main or selective switch T permits, on the one hand, opening or closing the circuit leading from the source of current $h$ to the automatic shifting switch $e$, $e_1$, $f_1$, and $f_2$, and thus to the charging condenser $d$, and, on the other hand, it permits connecting the charging condenser $d$ to the current supply means (ring $c$) independently of the shifting switch $e$, $e_1$, $f_1$ and $f_2$, for the purpose of regulation and testing of the installation. The switch T is eight-pole, having the stationary poles $t_1$—$t_2$, $t_3$—$t_4$, $t_5$—$t_6$, and $t_7$—$t_8$, which can be connected with one another in pairs, in the order mentioned, by means of four connecting bridges $t_{10}$, $t_{11}$, $t_{12}$ and $t_{13}$, arranged upon a switch lever $t_9$. Of said contacts, $t_1$ is connected with the negative terminal of the source of current $h$, $t_3$ with the positive pole thereof, $t_5$ is connected through the conductor $l_2$ with the contact element $f_2$ on the cradle of the barrel, $t_7$ to $t_2$; $t_4$ and $t_6$ are in contact with the cradle of the barrel through the conductor $l_1$ and the contact element $f_1$ on said cradle and $t_8$ is connected to the body of the gun through the conductor $l_3$.

The switch lever $t_9$ is capable of movement from a central zero position 0 to one side into an "adjusting position" K, and to the other side into a "firing position" S. In the zero position of the switch lever $t_9$ (Fig. 1) all the conductors, those leading from the source of current $h$ to the gun and to the charging condenser $d$ as well as those leading from the same to the current supply means $c$, are broken, and the charging condenser $d$ and the ring $c$ are electrically "dead". If, before the firing, the switch lever $t_1$ is shifted from the zero position into the adjusting position (Fig. 3) for testing the wiring and adjusting the device, it first connects, in an intermediate position $K_1$ (Fig. 2) the source of current $h$ to the charging condenser $d$ through the connections then existing, $h$ (+), $t_3$, $t_{11}$, $t_4$, $l_1$, $f_1$, $e$, $d_2$ and $h$ (−), $t_1$, $t_{10}$, $t_2$, $t_7$, $t_{13}$, $t_8$, $l_3$, $b_1$, $a$, $d_1$, and said condenser becomes charged. In the adjusting position K itself (Fig. 3) the existing connections are $d_2$, $e$, $f_1$, $l_1$, $t_6$, $t_{12}$, $t_5$, $l_2$, $f_2$, $e_1$, $c$ and $d_1$, $a$, whereby the voltage of condenser $d$, previously charged, but then again disconnected from the source of current $h$ is applied to the current supply means (ring $c$ and inner wall of the barrel). Now the rings $c$ and the barrel may be tested as to whether current has been received and whether voltage is maintained, by means of a current indicator or a short circuiting conductor which is connected between $c$ and $a$.

Figure 5:
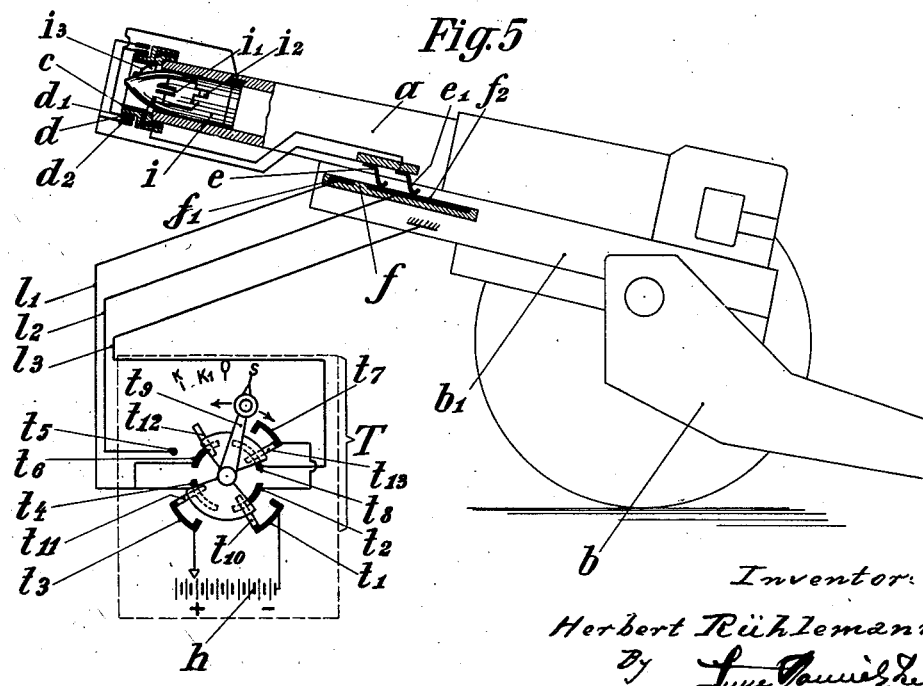

For firing, the switch lever T is moved from the zero position 0 into the firing position S (Fig. 4). Thereby the charging condenser $d$ is connected to the source of current $h$ and under voltage, through similar means as in the intermediate position $K_1$, during passage into the adjusting position K, through the connections which then exist, but however is still disconnected from the ring $c$. After firing a shot the barrel $a$ recoils and at the beginning of this movement the charging condenser $d$ is disconnected from the source of current $h$ due to the sliding-off of the sliding contact $e$ from the stationary contact element $f_1$. Directly thereafter the sliding contact $e$ runs upon the rear stationary contact element $f_2$ upon the gun cradle (Fig. 5) which has already been contacted by the second sliding contact $e_1$. Then the ring $c$ at the muzzle of the gun is at the voltage of the charging condenser $d$, through the connections $d_2$, $e$, $f_2$, $e_1$ and $c$. This position of connections is attained before the fired-off projectile $i$ (Fig. 5) has reached the muzzle of the gun. The electric ignitor thereof contains, for example, a condenser $i_1$, which is chargeable from the exterior, as a source of igniting current, which thereafter, for example, when the projectile strikes its mark, will deliver its energy through an igniting agent $i_2$. A contact element $i_3$, which may be swung out in a radial direction is provided externally on the ignitor for the purpose of charging the ignitor condenser $i_1$, said contact element being connected with one coating of the ignitor condenser $i_1$. Its second condenser coating is connected with the igniting element and thereby is connected through the projectile and the barrel of the gun with one coating or armature of the charging condenser $d$.

When the projectile leaves the muzzle of the gun, its outwardly-swinging ignitor contact element $i_3$ comes into contact with the ring $c$ and the ignitor condenser $i_1$ is charged by the charging condenser $d$ to the voltage necessary for producing the desired kind of operation. The previous disconnection of the source of current $h$ from the charging condenser $d$ serves the purpose of preventing back-flows of current from $d$ to $h$, which would disturb the transfer of energy into the ignitor of the projectile and might prevent the orderly and correct charging thereof.

Upon the forward movement of the barrel the sliding contact $e$, by sliding off from the cooperating contact element $f_2$, disconnects the charging condenser $d$ from the current supply ring $c$ and by the following running of the contact $e$ upon the contact element $f_1$ it is again connected to the source of current $h$ to take up current energy anew.

I claim as my invention:

1. Circuit for supplying electrical energy to projectile ignitors comprising an energy-supplying device which is connectible to a source of current independent thereof to charge it to a proper voltage and which is transiently connectible to the ignitor, and means whereby the introduction of said voltage into the normally electrically dead energy-supplying device is caused by applying an ignitor thereto.

2. Circuit for supplying electrical energy to projectile ignitors in a recoil gun, after the projectile is fired from said gun, comprising an energy-supplying device located adjacent the muzzle of the gun, and having means cooperating with the ignitor to transfer energy thereto, said energy-supplying device being connectible to a source of current independent thereof to charge it to a proper voltage and being transiently connectible to the ignitor, conducting means connecting the energy-supplying device with said energy transfer means, a switch interposed in such conducting means, and comprising an element moved by the gun upon its recoil movement and another element which is relatively stationary, whereby the said switch is opened when the barrel of the gun is in its forward position, but is automatically closed by the recoil movement of the gun, immediately after firing and before the ignitor of the projectile has reached the energy-supplying means.

3. Circuit for supplying electrical energy to projectile ignitors comprising a charging condenser which is connectible to a source of current independent thereof to charge it to a proper voltage and which is transiently connectible to the ignitor, and a switch actuated by mechanical motion, whereby the introduction of said voltage into the normally electrically dead charging condenser is caused by actuating the switch.

4. Circuit for supplying electrical energy to projectile ignitors, comprising a charging condenser, conducting means connecting said condenser to a source of current independent thereof to charge it to a proper voltage, means for connecting said condenser transiently to the ignitor, a connection-shifting switch interposed in the said conducting means and actuated by mechanical movement produced by firing the projectile, said switch in one position connecting the charging condenser to the source of current and in another position disconnecting the said condenser from the source of current and connecting it to the means which are transiently connectible to the ignitor.

5. A circuit in accordance with claim 3, and comprising also means whereby the introduction of the voltage into the charging condenser may be controlled manually, independently of the control thereof by the automatic switch.

6. Circuit in accordance with claim 3, comprising also a current transfer means, a second, manually-operable switch, which in one position disconnects the source of current from the charging condenser and the current transfer means, in a second position connects the charging condenser to the source of current and in a third position connects the charging condenser with the current transfer means while disconnecting the current source from the charging condenser.

7. A device for supplying electrical energy to shells as they are fired from guns, comprising electrical capacity means arranged adjacent the muzzle of the gun, a source of electrical current to maintain the capacity means properly charged whereby the shell is energized from the capacity means when it leaves the muzzle of the gun, and means for selectively setting the source of electrical current in communication with the capacity means.

8. A device for supplying electrical energy to shells as they are fired from guns, comprising a condenser arranged adjacent the muzzle of the gun, a source of electrical current to maintain the condenser properly charged whereby the shell is energized from the condenser when it leaves the muzzle of the gun, and means for selectively setting the source of electrical current in communication with the condenser.

9. An electrical system for supplying electrical energy to shells as they are fired from guns, comprising a condenser arranged adjacent the muzzle of the gun, a source of current, a selective electric switch, and connections between the condenser, source of current and the switch to charge the condenser when the circuit is closed by the switch whereby the shell is energized from the condenser when it leaves the muzzle of the gun.

10. An electrical system for supplying electrical energy to shells as they are fired from guns, comprising a condenser arranged adjacent the muzzle of the gun, a source of current, an electric switch, connections between the condenser, source of current and the switch to charge the condenser when the circuit is closed by the switch whereby the shell is energized from the condenser when it leaves the muzzle of the gun, and means for breaking the current between the source of current and the condenser just before the shell passes through the energy field of the condenser.

11. A device for supplying electrical energy to shells as they are fired from guns, comprising electrical capacity means arranged adjacent the muzzle of the gun, a source of electrical current to maintain the capacity means properly charged whereby the shell is energized from the capacity means when it leaves the muzzle of the gun, and a safety device to prevent premature energization of the shell.

12. A device for supplying electrical energy to shells as they are fired from guns, comprising electrical capacity means arranged adjacent the barrel of the gun, a source of electrical current to maintain the capacity means properly charged whereby the shell is energized from the capacity means when it leaves the barrel of the gun, and means for selectively setting the source of electrical current in communication with the capacity means.

13. A device for supplying electrical energy to shells as they are fired from guns, comprising a condenser arranged adjacent the barrel of the gun, a source of electrical current to maintain the condenser properly charged whereby the shell is energized from the condenser when it leaves the barrel of the gun, and means for selectively setting the source of electrical current in communication with the condenser.

In testimony whereof, I affix my signature.

HERBERT RÜHLEMANN.